Patented June 15, 1937

2,083,824

UNITED STATES PATENT OFFICE 2,083,824

MANUFACTURE OF HYDROCYANIC ACID

Harlan A. Bond and Charles Roberts Harris, Niagara Falls, N. Y., assignors to E. I. du Pont de Nemours & Company, Wilmington, Del., a corporation of Delaware No Drawing. Application September 19, 1934, Serial No. 744,712

12 Claims. (Cl. 23—151)

This invention relates to the manufacture of hydrocyanic acid and more particularly, to the production of hydrocyanic acid by the catalytic reaction between a nitrogen compound and a hydrocarbon.

Various methods for producing hydrocyanic acid by reacting nitrogenous compounds with carbonaceous materials have been proposed. One method of producing hydrocyanic acid in this way comprises reacting a nitrogenous compound with a gaseous hydrocarbon or hydrocarbon vapor in the presence of a platinum metal catalyst. Two examples of this method may be mentioned, viz., (a) the use of ammonia and (b) the use of nitric oxide as the nitrogenous compound.

One proposed method of making hydrocyanic acid by the reaction of a hydrocarbon with ammonia in the presence of a platinum metal catalyst is carried out by passing a mixture of ammonia, oxygen and an excess of hydrocarbon gas or vapor at a suitable reaction temperature, e. g., 400° C. or higher, over the catalyst. The reaction of ammonia with a hydrocarbon is an endothermic one but, as the process is carried out, the amount of oxygen and of excess hydrocarbon may be so adjusted that the heat evolved by the exothermic reaction between the excess hydrocarbon and the oxygen is somewhat greater than the heat required for the endothermic reaction between the ammonia and the hydrcarbon; hence the net result of the combined reaction is somewhat exothermic. This method of producing hydrocyanic acid by the reaction of ammonia with a hydrocarbon is described in Andrussow, U. S. Patent 1,934,838.

A method of producing hydrocyanic acid by reacting nitric oxide with a hydrocarbon in the presence of a platinum metal catalyst is described in the pending U. S. patent application, Serial Number 701,361. According to this method, a mixture of nitric oxide, excess hydrocarbon and preferably a small amount of oxygen and/or water vapor, together with a diluent gas, such as nitrogen, is heated to 300 to 400° C. and passed over a platinum metal catalyst. In a preferred method of carrying out this nitric oxide process, the nitric oxide is produced by oxidizing ammonia with an excess of air and the hot off gas from the ammonia oxidation, which consists of nitric oxide, water vapor, nitrogen, and a small proportion of oxygen, is mixed with hydrocarbon and the mixture is passed over the catalyst at a suitable temperature.

In the above mentioned processes, the catalyst used may be one of the platinum metals, i. e., platinum, rhodium, iridium, palladium, osmium or ruthenium, or a mixture or alloy of two or more of these metals. Such platinum metal catalysts have heretofore been used in the processes for producing hydrocyanic acid in their massive state, i. e., in the form of sheets, wires, turnings, etc., the preferred form being one or more layers of fine wire gauze made of the catalytic metal through which the reactant gases are passed. In practicing these processes, using platinum metals as catalysts, considerable difficulty has been experienced because of corrosion and subsequent disintegration of the catalytic metal. This corrosive action of the reactive gases upon the catalytic metal necessitates rather frequent replacement of the catalyst and also may result in some loss of the expensive catalytic material.

An object of this invention is to provide an improved method for producing hydrocyanic acid by reacting a nitrogen compound with a hydrocarbon in the presence of a platinum metal catalyst, wherein catalyst life is prolonged and improved yields of product are obtained. Other objects will be hereinafter apparent.

We have discovered that the corrosion and/or disintegration of the platinum metal catalyst in the above mentioned catalytic reactions may be inhibited or prevented by using a catalyst body which comprises a suitable refractory material coated with a layer of the platinum metal. Such a catalyst is of the type commonly known as a supported catalyst, i. e., the platinum metal is supported by the refractory material. The supporting material itself may or may not have catalytic activity; preferably, a support is used which has little or no adverse catalytic activity and which contains little or none of substances which may cause "poisoning" of the platinum metal. For example, compounds of iron or nickel will "poison" the catalyst and should be absent in the supporting material. We have further found that there is substantially no corrosion or disintegration of the platinum metal in the supported type catalyst body, provided that there is a high degree of adherence between the layer of the platinum metal and the material on which it is supported. However, we have found that even in those cases where the degree of adherence is somewhat poor, while some corrosion or disintegration may occur, this is considerably less than occurs when a massive form of a platinum metal, e. g., wire gauze, is used.

As indicated above, it is preferable to employ a supported platinum metal catalyst in which there is a high degree of adherence between the metal and its support. A particular supported platinum metal catalyst which is eminently suited for the purposes of our invention because of the high degree of adherence between the metal and its support and also because of a high degree of uniformity of the metal coating on the support is disclosed in the copending application of C. R. Harris, entitled "Catalyst preparation", filed of even date herewith. This particular supported platinum metal catalyst is prepared by coating the surface of a suitable support with a reducible compound of one or more platinum metals and then thermally decomposing said compound in the presence of a moving stream of a non-reducing gas. The non-reducing gas which may be used for this purpose may be either inert gas, such as nitrogen, argon, etc. or an oxidizing gas, such as oxygen or air which does not react with the platinum metal to form a volatile compound thereof. Preferably, and for the sake of convenience and economy, air is used as the non-reducing gas in the preparation of catalyst bodies containing those platinum metals which do not form volatile oxides, namely, platinum, palladium and rhodium. If the catalyst contains large amounts of iridium, osmium or ruthenium, nitrogen is preferably used as the non-reducing gas. During the step of heating the materials to thermally decompose the platinum metal compound, the non-reducing gas is passed over the surface of the said material at a rate sufficient to carry off at least part of the gaseous decomposition products. The temperature at which the platinum metal compound is thermally decomposed may vary between wide limits; in most cases, a temperature of at least about 500° C. will be required to obtain the desired decomposition to transform the platinum metal compound to the free metal. We have found that the best results are obtained in utilizing this catalyst for the production of hydrocyanic acid when the catalyst has been heated as above described in the presence of a non-reducing gas at a temperature of 1100 to 1400° C. If desired, the actual decomposition may be obtained at a temperature below 1100° C. and the catalytic material subsequently may be heated to 1100° to 1400° C. in the presence of a non-reducing gas whereupon it acquires a catalytic activity substantially equal to that obtained by carrying out the actual thermal decomposition at 1100° to 1400° C.

We have further discovered that the highest yield of hydrocyanic acid from the catalytic reaction of a nitrogen compound with a hydrocarbon in the presence of a supported platinum metal catalyst is obtained by using some form of silica, preferably of high purity, as the catalyst support. Examples of forms of silica which we have found suitable are vitreous silica, i. e., fused silica, preferably broken into small pieces, natural silica of high purity, such as rock quartz or dehydrated silica gel. We have found that other siliceous materials may be used as catalyst supports in practicing our invention with satisfactory results, although the yields may be somewhat lower than those obtained by using substantially pure silica as the catalyst support. Examples of such other siliceous supports are a crude silicon carbide (carborundum) and silica alumina gel, which is made by simultaneously precipitating a mixture of silica gel and aluminum hydroxide and dehydrating the mixture. If the catalyst has been prepared by the process of the above mentioned copending application of C. R. Harris, we have found that the catalysts supported on vitreous silica or other non-porous support, are generally superior to those supported on silica gel or other porous supports.

The following examples further illustrate our invention:

*Example 1*

A platinum rhodium supported catalyst body was made by decomposing soluble compounds of platinum and rhodium on the surface of particles of vitreous silica of about 10 mesh size. The silica was thoroughly wet with an aqueous solution containing chloroplatinic acid and rhodium chloride in amounts equivalent to 106.4 grams of platinum and 26.6 grams of rhodium per liter and the wet material was dried by heating and stirring in a shallow container. The dried material then was heated to a temperature of about 1200° C. for about two hours, while a current of air was passed through the material.

About 10 cc. of the catalyst body thus prepared was supported in a 16 mm. I. D. silica tube on a perforated sillimanite disc and the tube was placed in a vertical position in an electric resistance furnace. A mixture of 5 volumes of nitric oxide, 3.75 volumes of oxygen, 40 volumes of nitrogen and 7.5 volumes of water vapor was passed downwardly through the silica tube and through the catalyst body at a rate of about 5,625 cc. per minute, while the temperature, as recorded just below the catalyst, was increased to about 700° C. Natural gas containing about 83% of methane then was added to the mixture of gases at a rate of about 800 cc. per minute and the temperature in the reaction tube was raised to about 1100° C. and there maintained throughout the run. The off gases from the silica reaction tube were reacted with caustic soda to form sodium cyanide and the amount of sodium cyanide thus formed was determined by chemical analysis.

A second lot of catalyst was made following the procedure given above but using a purified dehydrated silica gel in place of vitreous silica as the catalyst support. This second lot of catalyst was used in the above described reaction of nitric oxide and hydrocarbon produced hydrocyanic acid.

The resultant data are given in the following table:

| Catalyst support | Yield of HCN (based on NO used) |
|---|---|
| | *Percent* |
| Vitreous silica | 72.5 |
| Silica gel | 58.2 |

*Example 2*

A number of supported platinum rhodium catalysts made with various supporting materials were made up according to the procedure described in Example 1. Each catalyst then was used in the reaction of nitric oxide with hydrocarbon to produce hydrocyanic acid. In these runs, the nitric oxide was obtained by oxidizing ammonia, using platinum rhodium alloy wire gauze as oxidation catalyst through which was passed a mixture of one part of ammonia to about ten parts of air. Substantially all of the ammonia passed over the catalyst was oxidized by this procedure, yielding a gas containing chiefly nitric oxide, water vapor, nitrogen and a small amount of oxygen. This gas was mixed with a commercial fuel gas which contained 29.5% of methane, 3.3% of other hydrocarbons, 52% of hydrogen and the remainder oxides of carbon, oxygen and nitrogen; about 0.2 part by volume of the fuel gas was mixed with one part of the off gas from the ammonia oxidation. The mixture of ammonia oxidation off gas and fuel gas was passed over the supported platinum rhodium catalyst at a temperature of about 1100° C. The hydrocyanic acid formed was recovered as sodium cyanide and the yield determined as in Example 1. The following tabulation shows the different materials used as catalyst supports and the yields of hydrocyanic acid obtained:

| Catalyst support | Yield of HCN (based on NH₃ used) |
| --- | --- |
| | Percent |
| Vitreous silica | 70 |
| Rock quartz | 59 |
| Silica gel | 50 |
| Carborundum | 46 |
| Silica-alumina gel | 37 |

*Example 3*

Supported platinum metal catalysts were made according to the procedure described in Example 1, using vitreous silica as support and various platinum metals as the catalytic materials. The aqueous solutions used in making these catalysts contained chloroplatinic acid and/or the chlorides of the other platinum metals utilized. Each of the catalysts thus prepared was used as catalyst in the preparation of hydrocyanic acid, using the material and method of Example 2. In these runs, the reaction temperature was maintained at about 1000° C. The results obtained are given in the following table:

| Run | Composition of metal in catalyst | | | Yield of HCN (Based on NH₃ used) |
| --- | --- | --- | --- | --- |
| | Platinum | Rhodium | Palladium | |
| | Percent | Percent | Percent | Percent |
| A | 100 | | | 37.7 |
| B | 90 | 10 | | 65.6 |
| C | 90 | | 10 | 17.2 |
| D | | | 100 | 28.3 |

In runs A and B, the ratio of the fuel gas to the ammonia oxidation off-gas in the reaction mixture was adjusted by regulating the flow rates of the fuel gas, air and ammonia until an optimum was reached and the yields given were calculated from the amount of hydrocyanic acid produced by using these optimum mixtures. This was not done in runs C and D. The rates of flow of the fuel gas, air and ammonia in the above runs are given below:

*Rates of gas flow*

| Run | Fuel gas | Ammonia | Air |
| --- | --- | --- | --- |
| | cc./min. | cc./min. | cc./min. |
| A | 1000 | 500 | 5000 |
| B | 1700 | 500 | 5000 |
| C | 1200 | 500 | 5000 |
| D | 2400 | 500 | 5000 |

We claim:
1. A process for the manufacture of hydrocyanic acid which comprises reacting a nitrogen compound with a hydrocarbon in the presence of a catalyst body comprising a non-porous refractory material, the surface of which is coated with a platinum metal.

2. A process for the manufacture of hydrocyanic acid which comprises reacting a nitrogen compound with a hydrocarbon in the presence of a catalyst body comprising a vitreous silica, the surface of which is coated with a platinum metal.

3. A process for the manufacture of hydrocyanic acid which comprises reacting a nitrogen compound with a hydrocarbon in the presence of a catalyst body comprising a vitreous silica, the surface of which is coated with platinum and palladium.

4. A process for the manufacture of hydrocyanic acid which comprises reacting nitric oxide with a hydrocarbon in the presence of a catalyst body comprising vitreous silica, the surface of which is coated with an adherent layer of a platinum metal.

5. A process for the manufacture of hydrocyanic acid which comprises reacting ammonia with a hydrocarbon in the presence of a catalyst body comprising vitreous silica, the surface of which is coated with an adherent layer of a platinum metal.

6. A process for the manufacture of hydrocyanic acid which comprises reacting nitric oxide with methane at an elevated temperature in the presence of a catalyst body comprising vitreous silica, the surface of which is coated with a substantially uniform, adherent layer of platinum and rhodium.

7. A process for the manufacture of hydrocyanic acid which comprises reacting ammonia and oxygen with methane at an elevated temperature in the presence of a catalyst body comprising vitreous silica, the surface of which is coated with an adherent layer of platinum and rhodium.

8. A process for the manufacture of hydrocyanic acid which comprises reacting a nitrogen compound with a hydrocarbon in the presence of a supported platinum metal catalyst, said catalyst having been prepared by a method comprising thermally decomposing a compound of a platinum metal on the surface of a refractory material at a temperature not lower than about 500° C. in the presence of a moving stream of a non-reducing gas.

9. A process for the manufacture of hydrocyanic acid which comprises reacting nitric oxide with a hydrocarbon in the presence of a supported platinum metal catalyst, said catalyst having been prepared by a method comprising thermally decomposing compounds of platinum and rhodium on the surface of silica at a temperature of 1100 to 1400° C. in the presence of a moving stream of a gas selected from the group comprising oxygen, nitrogen and an oxygen-nitrogen mixture.

10. A process for the manufacture of hydrocyanic acid which comprises reacting ammonia with a hydrocarbon in the presence of a supported platinum metal catalyst, said catalyst having been prepared by a method comprising thermally decomposing a compound of platinum and rhodium on the surface of silica at a temperature not lower than about 500° C. in the presence of a moving stream of a gas selected from the group comprising oxygen, nitrogen and an oxygen-nitrogen mixture.

11. A process for the manufacture of hydrocyanic acid which comprises reacting a nitrogen compound with a hydrocarbon in the presence of a catalyst body comprising a vitreous silica, the surface of which is coated with platinum and rhodium.

12. A process for the manufacture of hydrocyanic acid which comprises reacting ammonia and oxygen with a hydrocarbon in the presence of a supported platinum metal catalyst, said catalyst having been prepared by a method comprising thermally decomposing a compound of platinum and rhodium on the surface of silica at a temperature not lower than about 500° C. in the presence of a moving stream of a gas selected from the group comprising oxygen, nitrogen, and an oxygen-nitrogen mixture.

HARLAN A. BOND.
CHARLES ROBERTS HARRIS.